United States Patent
Gauthier

(10) Patent No.: US 9,463,697 B1
(45) Date of Patent: Oct. 11, 2016

(54) DUAL DATA RATE TRACTION CONTROL SYSTEM FOR A TWO WHEEL DRIVE ELECTRIC VEHICLE

(71) Applicant: Atieva, Inc., Menlo Park, CA (US)

(72) Inventor: Jean-Philippe Gauthier, San Francisco, CA (US)

(73) Assignee: ATIEVA, INC., Menlo Park, CA (US)

( * ) Notice: Subject to any disclaimer, the term of this patent is extended or adjusted under 35 U.S.C. 154(b) by 0 days.

(21) Appl. No.: 14/723,533

(22) Filed: May 28, 2015

(51) Int. Cl.
*B60L 3/10* (2006.01)
*B60L 3/12* (2006.01)
*B60L 11/18* (2006.01)
*B60W 30/18* (2012.01)

(52) U.S. Cl.
CPC .............. *B60L 3/106* (2013.01); *B60L 3/10* (2013.01); *B60L 3/104* (2013.01); *B60L 3/108* (2013.01); *B60L 3/12* (2013.01); *B60L 11/1803* (2013.01); *B60W 30/18172* (2013.01); *Y02T 10/644* (2013.01); *Y02T 10/7275* (2013.01)

(58) Field of Classification Search
CPC ........ B60L 3/106; B60L 3/108; B60L 3/104; B60L 3/10; B60L 3/12; B60L 11/1803; B60W 30/18172; Y02T 10/644; Y02T 10/7275
See application file for complete search history.

(56) References Cited

U.S. PATENT DOCUMENTS

| | | | |
|---|---|---|---|
| 5,879,265 A * | 3/1999 | Bek | B60K 6/52 180/65.6 |
| 7,024,290 B2 * | 4/2006 | Zhao | B60K 6/445 180/65.6 |
| 7,739,005 B1 | 6/2010 | Tang | |
| 7,742,852 B1 | 6/2010 | Tang | |
| 7,747,363 B1 | 6/2010 | Tang | |
| 8,453,770 B2 | 6/2013 | Tang | |
| 2014/0257613 A1 | 9/2014 | Tang | |
| 2015/0005988 A1 * | 1/2015 | Cox | B60L 3/108 701/3 |
| 2016/0020717 A1 * | 1/2016 | Tang | H02P 6/10 318/798 |
| 2016/0020718 A1 * | 1/2016 | Tang | H02P 21/30 318/798 |
| 2016/0020719 A1 * | 1/2016 | Tang | H02P 27/06 318/798 |

* cited by examiner

*Primary Examiner* — Russell Frejd
(74) *Attorney, Agent, or Firm* — Patent Law Office of David G. Beck

(57) ABSTRACT

A traction control system is provided that is applicable to both two wheel drive and four wheel drive electric vehicles, and which is capable of handling both low frequency and high frequency control duties. The system uses proportional gains in order to minimize controller delays and insure a natural feeling traction control system.

12 Claims, 8 Drawing Sheets

DUAL DATA RATE TRACTION CONTROL SYSTEM FOR A TWO WHEEL DRIVE ELECTRIC VEHICLE

FIELD OF THE INVENTION

The present invention relates generally to an electric vehicle and, more particularly, to a traction control system that takes advantage of the rapid torque response available from an electric motor to send torque to the axle that has traction.

BACKGROUND OF THE INVENTION

In response to the demands of consumers who are driven both by ever-escalating fuel prices and the dire consequences of global warming, the automobile industry is slowly starting to embrace the need for ultra-low emission, high efficiency cars. While some within the industry are attempting to achieve these goals by engineering more efficient internal combustion engines, others are incorporating hybrid or all-electric drive trains into their vehicle line-ups. To meet consumer expectations, however, the automobile industry must not only achieve a greener drive train, but must do so while maintaining reasonable levels of performance, range, reliability, and cost.

In recent years, electric vehicles have proven to be not only environmentally friendly, but also capable of meeting, if not exceeding, consumer desires and expectations regarding performance. While early electric vehicles used DC motors in order to achieve the variable levels of speed and torque required to drive a vehicle, the advent of modern motor control systems have allowed AC motors to deliver the same level of performance while providing the many benefits associated with AC motors including small size, low cost, high reliability and low maintenance.

In addition to its many other beneficial characteristics, an electric motor is capable of providing a high starting torque and then rapidly modifying the developed torque as needed. For example, while an internal combustion engine (ICE) typically requires approximately 250 milliseconds to change its torque delivery, an electric traction motor is generally capable of changing its torque level in 10 milliseconds or less. As a result, electric motors hold the promise of greatly improved traction control over that achievable in an ICE-based vehicle. Unfortunately, as the wheel speed information used for traction control was developed based on the capabilities of ICE-based vehicles, this information is not updated at a high enough rate to take advantage of the capabilities of an electric traction motor.

A variety of approaches have been taken to try and utilize the capabilities of electric motors in the traction control system of an electric car. For example, U.S. Pat. No. 7,739,005 discloses an approach based on a conventional one motor per axle implementation that utilizes a low frequency controller (i.e., the first stage of a traction and stability control unit) in series with a high frequency controller (i.e., the second stage of the traction and stability control unit). The low frequency controller attempts to keep a constant slip rate between the tractive wheels and the vehicle speed while the high frequency controller attempts to limit sudden changes in motor speed. Although the disclosed controller is capable of sending torque to the axle that has the most traction, it unfortunately relies on a PI controller or another controller with a memory, either of which adds a delay in the system response. As a result of the added delay, the system behavior appears less natural and more intrusive to the driver.

Accordingly, what is needed is a traction control system that can take advantage of the electric motor's fast response while relying on low frequency wheel signals, e.g., the wheel signals supplied by an ABS controller. The controller should also minimize system delays, thereby insuring a natural feeling control system. The present invention provides such a control system.

SUMMARY OF THE INVENTION

The method of the present invention provides traction control in an electric vehicle, where the electric vehicle is comprised of a motor coupled to an axle via a locking differential, and where the method includes the steps of (i) monitoring a torque value corresponding to the motor; (ii) monitoring a plurality of wheel speed sensors (e.g., ABS wheel speed sensors) corresponding to a plurality of vehicle wheels; (iii) determining a maximum wheel speed corresponding to the plurality of vehicle wheels; (iv) determining a minimum wheel speed corresponding to the plurality of vehicle wheels; (v) selecting a synchronized wheel speed from the maximum and minimum wheel speeds, where the maximum wheel speed is selected as the synchronized wheel speed if the torque value for the motor is positive, and where the minimum wheel speed is selected as the synchronized wheel speed if the torque value for the motor is negative; (vi) multiplying the synchronized wheel speed by a transmission ratio to yield a first synchronized motor speed, where the transmission ratio corresponds to the locking differential, and where the first synchronized motor speed is at a first sample frequency (e.g., 100 Hz); (vii) translating the first synchronized motor speed to a second synchronized motor speed, where the second synchronized motor speed is at a second sample frequency (e.g., 1000 Hz), and where the second sample frequency is higher than the first sample frequency; (viii) defining a maximum motor speed and a minimum motor speed from the second synchronized motor speed and a slip speed map; (ix) inputting the maximum motor speed, the minimum motor speed, and a motor speed corresponding to the motor into a traction controller (e.g., a simple proportional controller, a non-linear controller, etc.); (x) determining a first motor speed error from the maximum motor speed and the motor speed; (xi) determining a second motor speed error from the minimum motor speed and the motor speed; (xii) saturating the first and second motor speed errors to obtain first and second motor speed error correction values; (xiii) selecting a particular motor speed error correction value from the first and second motor speed error correction values; (xiv) feeding the particular motor speed error correction value to the traction controller; (xv) creating a torque command that brings the particular motor speed error correction value to zero; (xvi) determining a current motor torque demand; and (xvii) modifying the current motor torque demand by the torque command to yield a modified motor torque demand.

The step of monitoring a plurality of wheel speed sensors may include the steps of (i) monitoring a first wheel speed sensor corresponding to a first wheel and monitoring a second wheel speed sensor corresponding to a second wheel, where the first and second wheels are coupled to the first axle; (ii) monitoring a third wheel speed sensor corresponding to a third wheel and monitoring a fourth wheel speed sensor corresponding to a fourth wheel, where the third and fourth wheels are coupled to the second axle; (iii) determining a plurality of wheel speeds corresponding to the plurality of vehicle wheels; and (iv) comparing the plurality of wheel speeds to determine the maximum wheel speed and the minimum wheel speed.

The first synchronized motor speed may be translated to the second synchronized motor speed by interpolating the first synchronized motor speed and generating the second synchronized motor speed.

The method may further include the step of defining the slip speed map, where the slip speed map defines a maximum acceptable wheel slip.

The step of selecting the particular motor speed error correction value may include the step of determining if the current motor torque demand corresponds to a positive value or to a negative value, wherein if the current motor torque demand corresponds to the positive value then the particular motor speed error correction value corresponds to the first motor speed error correction value, and wherein if the current motor torque demand corresponds to the negative value then the particular motor speed error correction value corresponds to the second motor speed error correction value.

A further understanding of the nature and advantages of the present invention may be realized by reference to the remaining portions of the specification and the drawings.

BRIEF DESCRIPTION OF THE DRAWINGS

It should be understood that the accompanying figures are only meant to illustrate, not limit, the scope of the invention and should not be considered to be to scale. Additionally, the same reference label on different figures should be understood to refer to the same component or a component of similar functionality.

DESCRIPTION OF THE SPECIFIC EMBODIMENTS

As used herein, the singular forms "a", "an" and "the" are intended to include the plural forms as well, unless the context clearly indicates otherwise. The terms "comprises", "comprising", "includes", and/or "including", as used herein, specify the presence of stated features, process steps, operations, elements, and/or components, but do not preclude the presence or addition of one or more other features, process steps, operations, elements, components, and/or groups thereof. As used herein, the term "and/or" and the symbol "/" are meant to include any and all combinations of one or more of the associated listed items. Additionally, while the terms first, second, etc. may be used herein to describe various steps, calculations, or components, these steps, calculations, or components should not be limited by these terms, rather these terms are only used to distinguish one step, calculation, or component from another. For example, a first calculation could be termed a second calculation, and, similarly, a first step could be termed a second step, and, similarly, a first component could be termed a second component, without departing from the scope of this disclosure.

Figure 1:
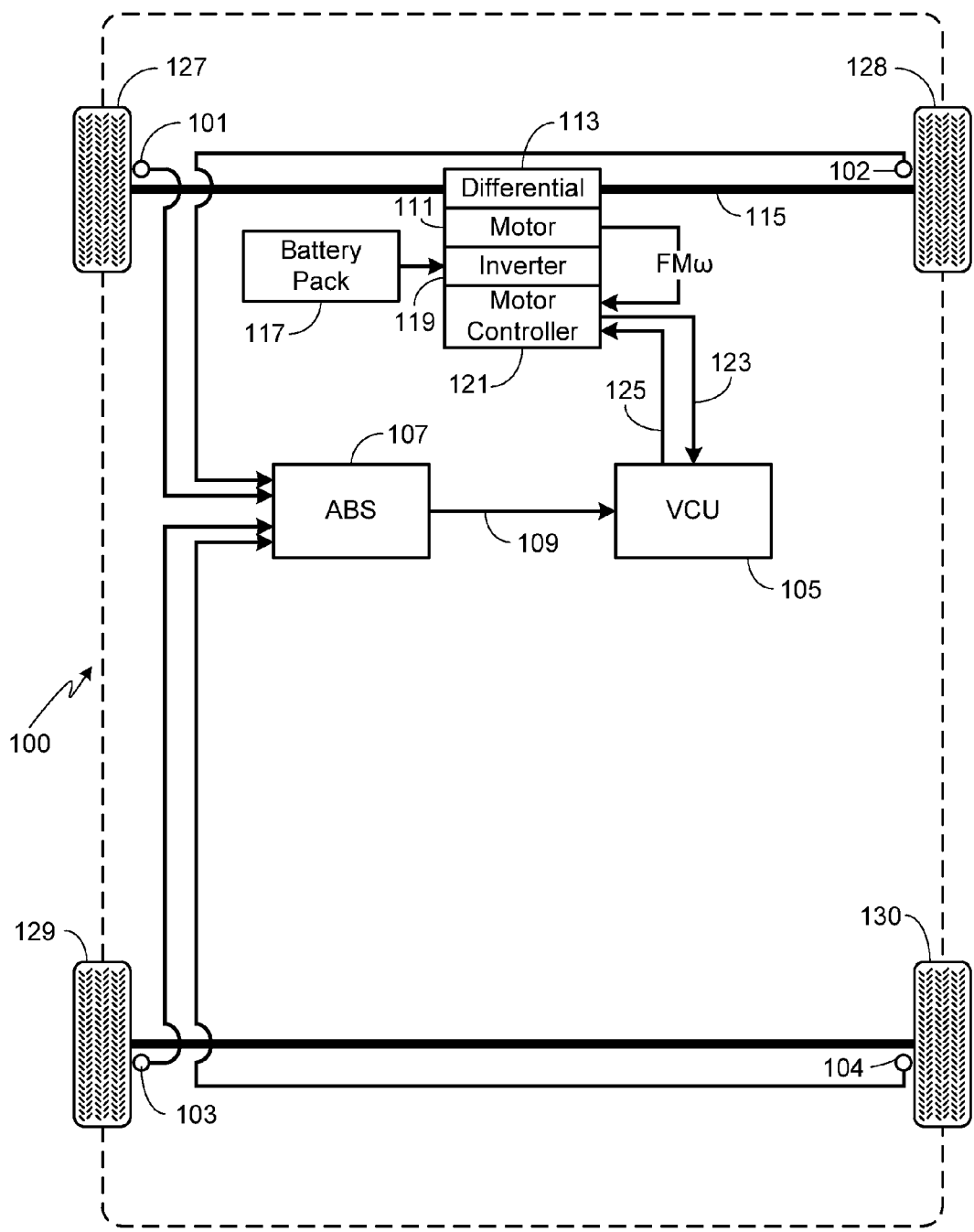
FIG. 1 illustrates a two-wheel drive implementation of a torque control system in accordance with the invention.
Figure 2:
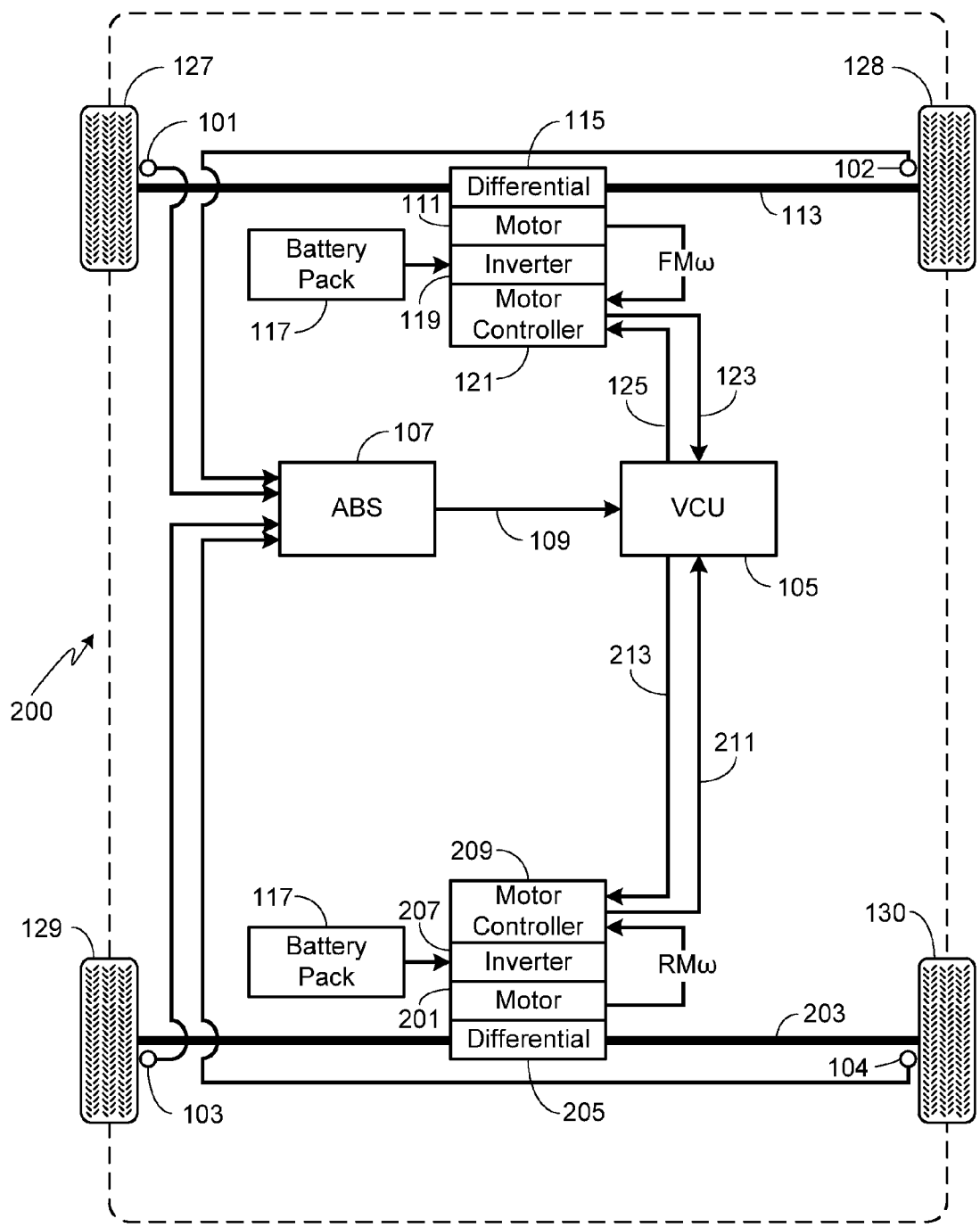
FIG. 2 illustrates a four-wheel drive implementation of a torque control system in accordance with the invention.

FIGS. 1 and 2 illustrate a torque control system in accordance with the invention with FIG. 1 illustrating a two-wheel drive (2wd) implementation and FIG. 2 illustrating a four-wheel drive (4wd) implementation. It should be understood that the 2wd implementation shown in FIG. 1 is equally applicable to front wheel and rear wheel drive systems alike. Note that the control system of the invention assumes (i) the use of a locking differential(s) and (ii) that at least one wheel is synchronized with the road, i.e., not slipping, at all time.

In accordance with the invention, a wheel speed sensor provides the wheel speed for each wheel of the vehicle 100/200. In particular, sensor 101 provides the wheel speed, LFWω, of the left front wheel; sensor 102 provides the wheel speed, RFWω, of the right front wheel; sensor 103 provides the wheel speed, LRWω, of the left front wheel; and sensor 104 provides the wheel speed, RRWω, of the left front wheel. Although the data from sensors 101-104 may be provided directly to the Vehicle Control Unit 105, preferably wheel speed sensors 101-104 are associated with the vehicle's Anti-lock Braking System (ABS) and as such, the wheel speed data required by VCU 105 may be supplied directly by ABS controller 107 as illustrated. In the exemplary embodiment in which wheel speed data is supplied by ABS 107 to VCU 105, the data is broadcast over the vehicle's Controller Area Network (CAN) bus, preferably at a frequency of 100 Hz over signal path 109. The wheel speed data is positive when the car is moving forward and negative when the car is reversing.

In vehicle 100, motor 111 is coupled to axle 113 via differential 115. Preferably differential 115 is a locking differential, i.e., a differential that may be locked using an integrated clutch or other means. Energy is supplied to motor 111 by a battery pack 117. Battery pack 117, which may be comprised of one or hundreds or thousands of rechargeable batteries, is preferably also used to supply the energy necessary for the various vehicle systems that require electrical power (e.g., lights, entertainment systems, navigation system, etc.). Battery pack 117 is coupled to motor 111 via an inverter 119 and a motor controller 121 that are used to insure that the energy delivered to drive motor 111 is of the proper form (e.g., correct voltage, current, waveform, etc.). In vehicle 200, in addition to motor 111 and the associated drive train components, a second motor 201 is coupled to axle 203 via differential 205, which is also preferably a locking differential. Motor 201 may be coupled to the same power source, i.e., battery pack 117 as shown, or a second battery pack. Inverter 207 and motor controller 209 couple the battery pack to motor 201.

Motor controller 121 monitors the current motor speed, FMω, of motor 111 and provides that data to VCU 105 via a high speed CAN bus signal line 123, preferably at a frequency of approximately 1000 Hz. Similarly, motor controller 209 of vehicle 200 provides the current motor speed, RMω, of motor 201 to VCU 105 via high speed CAN bus signal line 211, also at a frequency of approximately 1000 Hz. Motor speed has a positive value when the vehicle is moving forward and a negative value when the vehicle is moving backwards.

VCU 105 provides the motor torque command, FMTq, to motor controller 121 for motor 111 via a high speed CAN bus signal line 125, preferably at a frequency of approximately 1000 Hz. Similarly, VCU 105 provides the motor torque command, RMTq, to motor controller 209 for motor 201 via high speed CAN bus signal line 213, also at a frequency of approximately 1000 Hz. A positive value for the motor torque command pushes the vehicle forward while a negative value for the motor torque command pushes the vehicle backwards.

In accordance with the invention, the synchronized wheel speed, $SW\omega$, is based on the wheel speed of all four wheels 127-130. If the motor torque is positive, $SW\omega$ is the minimum of all four wheel speeds. If the motor torque is negative, $SW\omega$ is the maximum of all four wheel speeds. Multiplying the synchronized wheel speed, $SW\omega$, by the transmission ratio, K, of the differential when it is locked yields the synchronized motor speed, $SM\omega$. Note that for the 4wd implementation, the two differentials 115 and 205 may have different transmission ratios.

Since the synchronized motor speed, $SM\omega$, is based on the synchronized wheel speed, $SW\omega$, which is sampled at a relatively low frequency, e.g., 100 Hz, interpolation is used to obtain the synchronized motor speed at the desired update frequency, e.g., 1000 Hz. Therefore assuming a wheel speed sampling frequency of 100 Hz and a desired synchronized motor speed update frequency of 1000 Hz, then $SM\omega$ at 1000 Hz is given by:

$$SM\omega(1000\ Hz) = SM\omega(k) + (rate)(\Delta t)\text{ where}$$

$\Delta t$=time between k and the actual 1000 Hz sample,
rate=[$SM\omega$ (k)–$SM\omega$ (k–1)]/0.01,
and k is the wheel speed sampling frequency.

Figure 3:
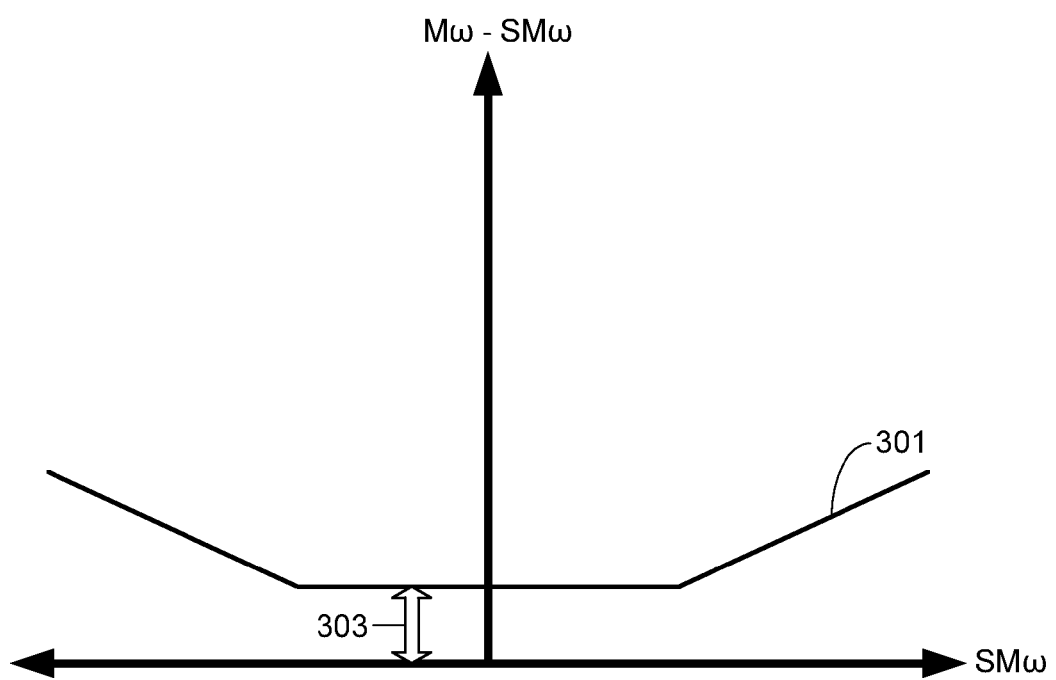
FIG. 3 illustrates an exemplary slip speed map.

In order to determine when VCU 105 should intervene, a slip speed map is defined, where the acceptable level of slip is given by the type of vehicle (e.g., performance, luxury, SUV, etc.) as well as the design goals for that particular vehicle. An exemplary slip speed map is shown in FIG. 3 in which the synchronized motor speed is graphed against slip speed. Curve 301 defines the maximum acceptable wheel slip. Above this line, VCU 105 intervenes. Region 303, shown in FIG. 3, is the system base slip. Note that $M\omega$ refers to the motor speed (as opposed to the synchronized motor speed).

Figure 4:
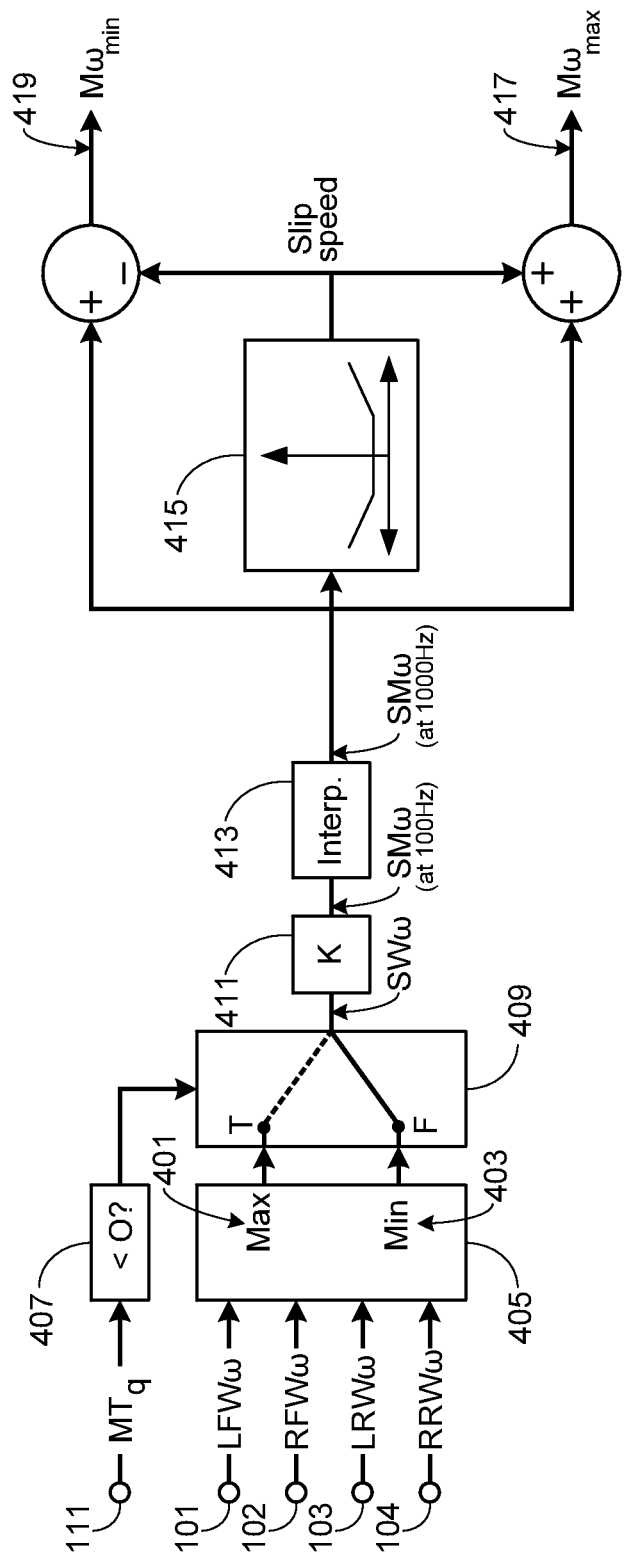
FIG. 4 illustrates the maximum and minimum speed limits set for the traction control system for a 2wd implementation of the invention.

FIG. 4 illustrates the maximum and minimum speed limits set for the traction control system of the invention for a 2wd implementation such as that shown in FIG. 1. The wheel speed from sensors 101-104 are monitored and compared, with the maximum wheel speed 401 and the minimum wheel speed 403 being output in 405. If motor 111 is producing a positive torque, determined in 407, then switch 409 selects the minimum (403) of all four wheel speeds as the synchronized wheel speed, $SW\omega$. If motor 111 is producing a negative torque, determined in 407, then switch 409 selects the maximum (401) of all four wheel speeds as the synchronized wheel speed, $SW\omega$. Multiplying the synchronized wheel speed, $SW\omega$, selected by switch 409 by the transmission ratio of the differential (411) yields the synchronized motor speed, $SM\omega$, at 100 Hz. Next, interpolation (413) is used to translate the synchronized motor speed at 100 Hz to the synchronized motor speed at 1000 Hz.

Figure 5:
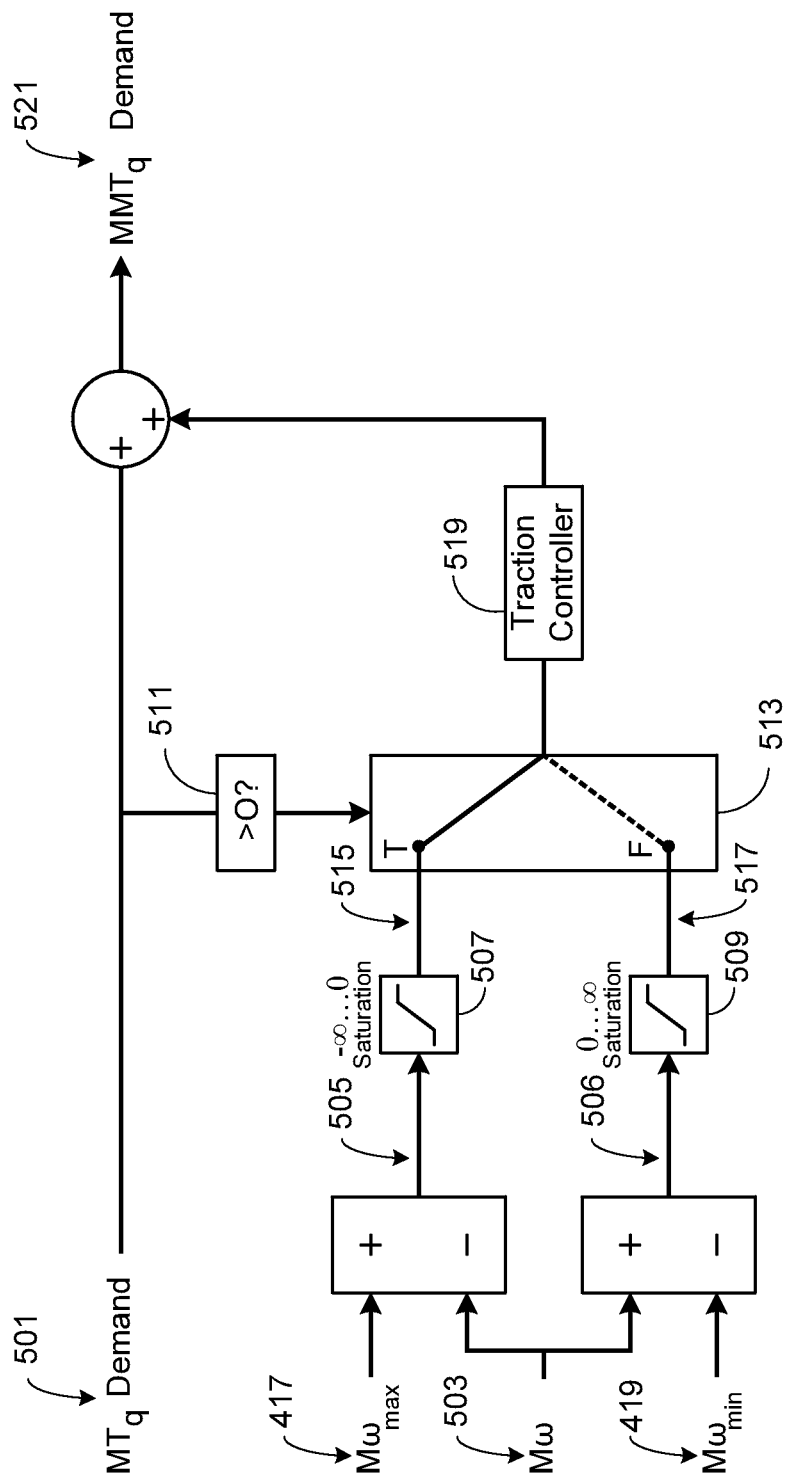
FIG. 5 illustrates a 2wd traction controller.

Based on the motor synchronized speed at 1000 Hz as well as the slip map (415), the maximum (417) and minimum (419) motor speeds are defined. The maximum (417) and minimum (419) motor speeds are then sent to the 2wd traction controller shown in FIG. 5. The traction controller modifies the motor torque demand MTq (501) in accordance with the motor speed $M\omega$ (503), the motor maximum speed error (505), and the motor minimum speed error (506). If the input to 507 is positive, then it outputs a value of 0, while if the input to 507 is negative, the output value is equal to the input value. Similarly, if the input to 509 is negative, then it outputs a value of 0, while if the input to 509 is positive, the output value is equal to the input value.

Next, it is determined whether the motor torque demand 501 is positive or negative. If the motor torque demand 501 is positive, as determined in 511, then switch 513 selects the motor maximum speed error correction value (515) as its output. If the motor torque demand 501 is negative, as determined in 511, then switch 513 selects the motor minimum speed error correction value (517) as its output. Lastly, the selected motor speed error correction value is sent to a traction controller 519, which outputs a torque correction command to bring the motor speed error correction value to zero in order to yield the modified motor torque demand, MMTq (521).

In the 4wd implementation of the invention (e.g., FIG. 2), in those situations in which the front and rear wheels/axles experience different levels of traction, the disclosed traction control system also determines the optimum distribution of torque between front axle 113 and rear axle 203. Thus, for example, if traction is lost on the rear axle, the traction controller will limit the torque applied to the rear axle and increase the torque applied to the front axle.

Figure 6:
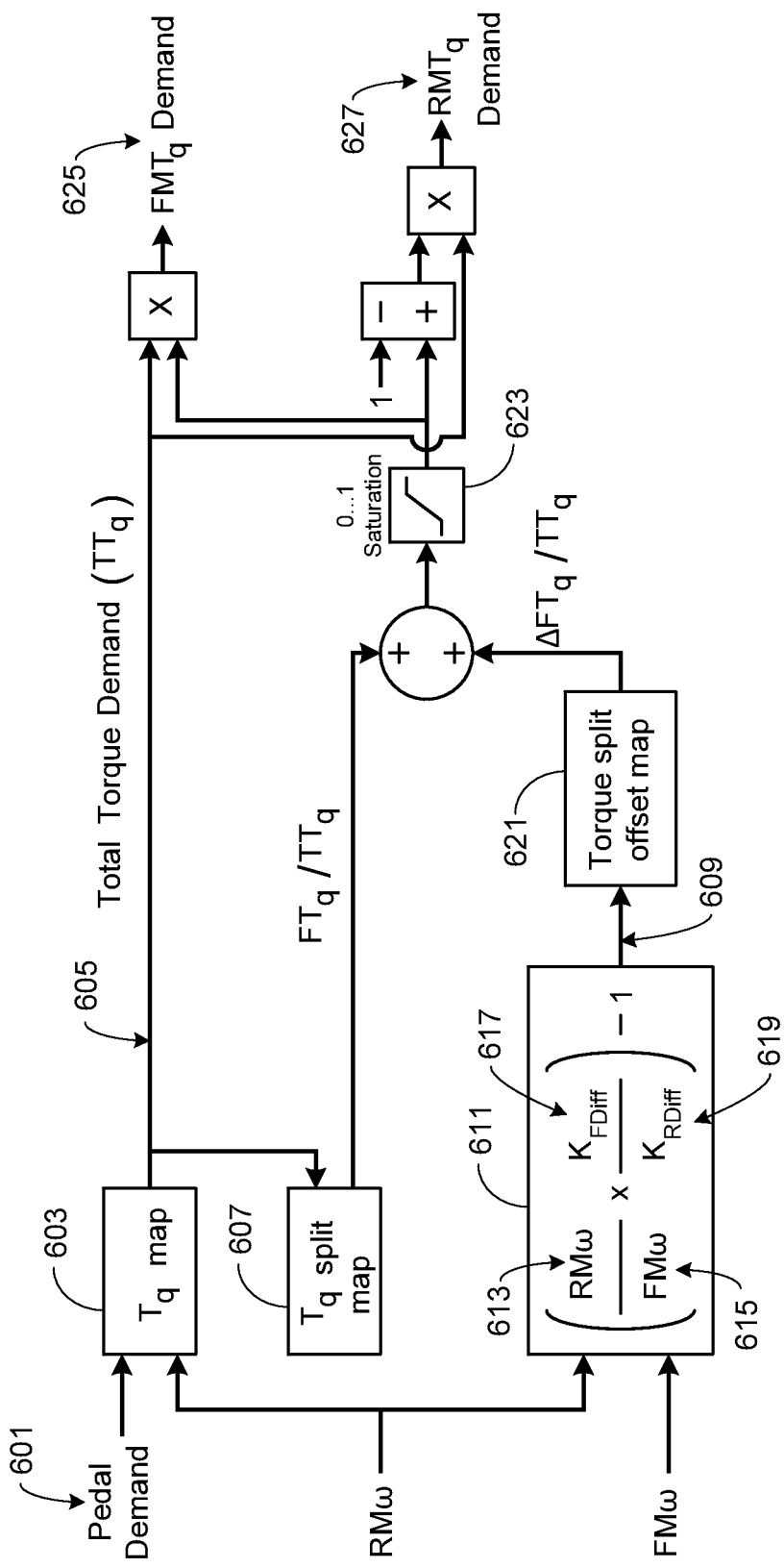
FIG. 6 illustrates the process by which the slip ratio between the two axles is calculated, thus allowing modification of the torque distribution between the front and rear axles.

The modification of the torque distribution between the front and rear axles is accomplished by calculating the slip ratio between the two axles. As shown in FIG. 6, when the driver depresses the pedal (601), a torque map (603) determines the corresponding total torque demand (605) placed on the vehicle's drive trains. A torque split map (607) determines the optimal torque split between the front and rear axles based on normal, i.e., non-slip, conditions. Torque map 603 and torque split map 607 are defined by the vehicle's manufacturer and are based on the capabilities of the front and rear drive trains as well as the performance goals for the vehicle.

Figure 7:
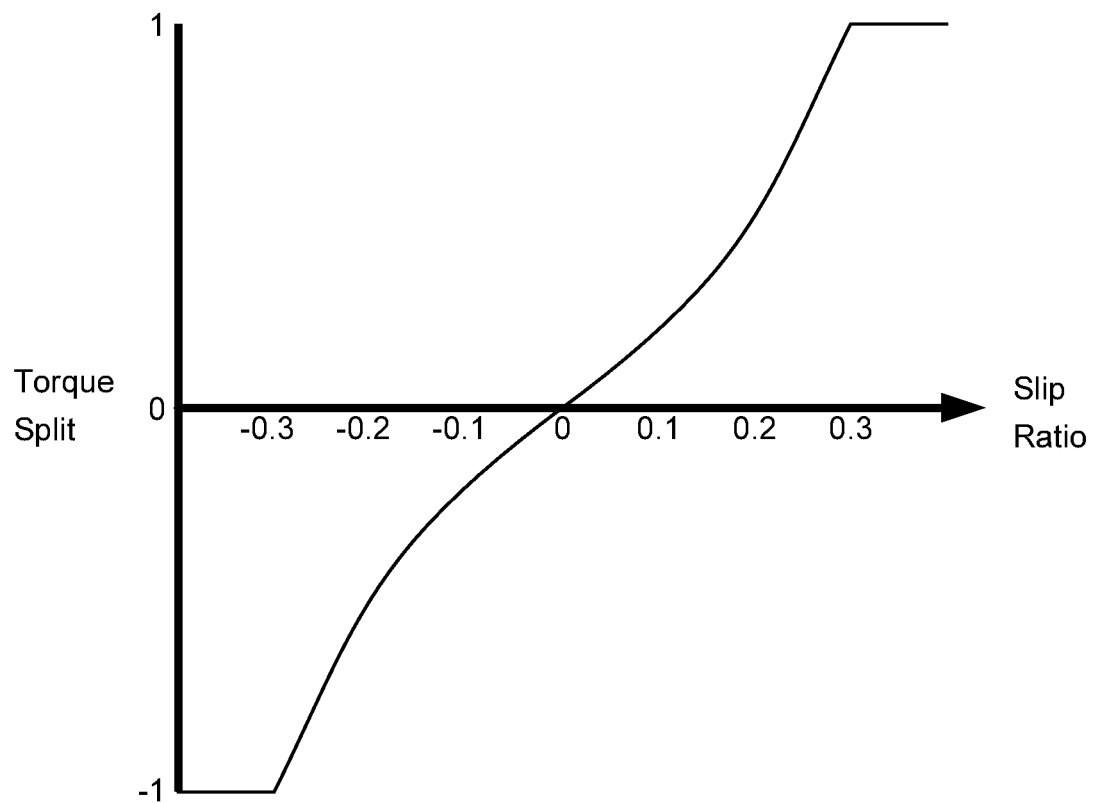
FIG. 7 provides an exemplary torque split offset map.

In order to determine the extent to which the torque applied to the front and rear axles must be modified from that provided by torque split map 607, the axle speed difference ratio (609) between the rear and front axles is determined (611). Ratio 609 is based on the rear motor speed 613, the front motor sped 615, the transmission ratio of the front differential 617 and the transmission ratio of the rear differential 619. The resultant ratio 609 is applied to a torque split offset map 621 that defines how the torque is transferred between the axles based on the current slip ratio. FIG. 7 illustrates an exemplary torque split offset map 621, where the exact shape of the map is given by the desired design and performance characteristics of the vehicle. In the example shown in FIG. 7, a slip ratio of 0 results in no difference between the torque applied to the front and rear axles. In step 623, if the input is less than 0 then the output is equal to 0; if the input is between 0 and 1 then the output is equal to the input; and if the input is greater than 1 then the output is equal to 1.

Figure 8:
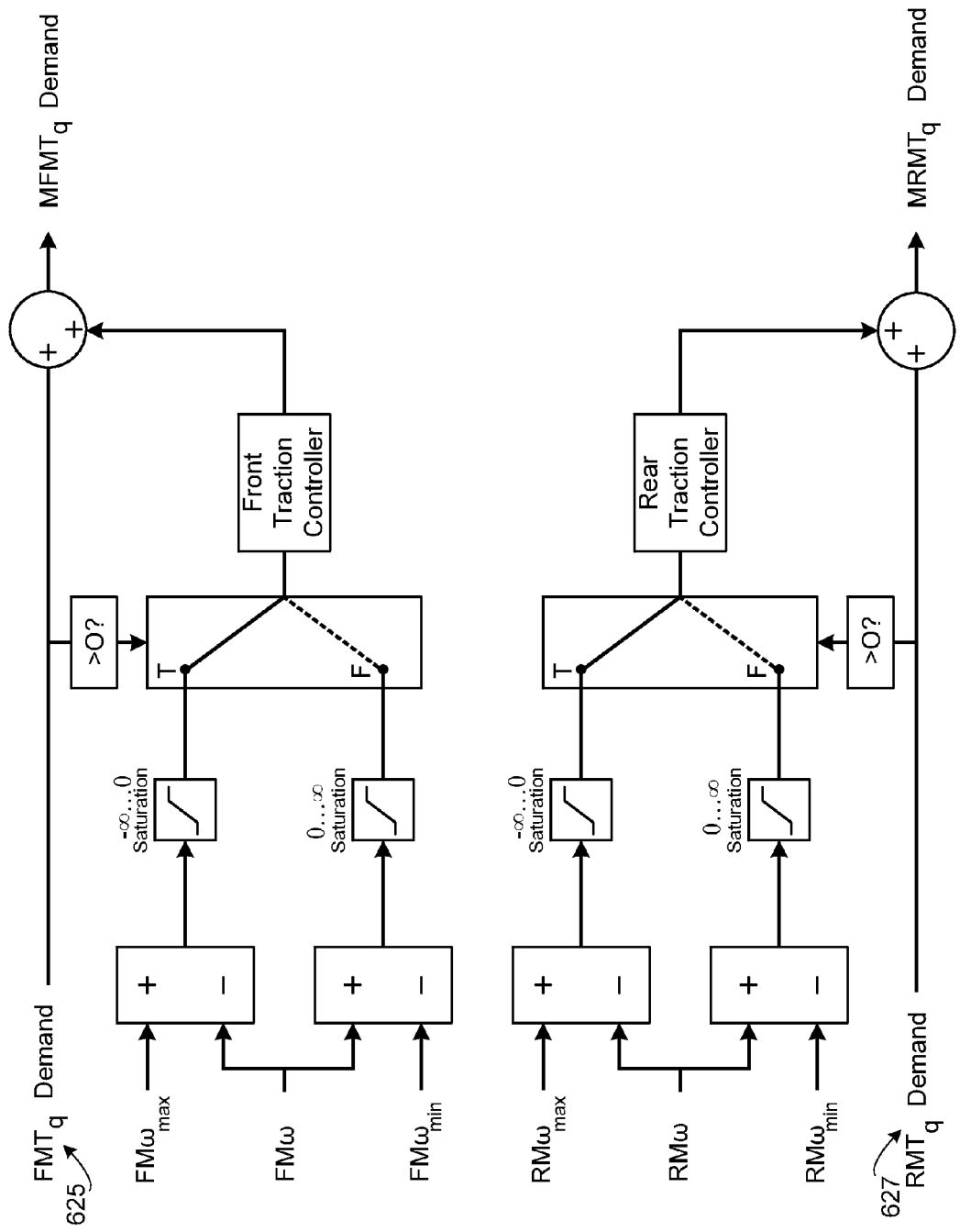
FIG. 8 illustrates a 4wd traction controller.

The output of the system shown in FIG. 6 is a front motor torque demand, FMTq demand (625) and a rear motor torque demand, RMTq demand (627). Once the front and rear motor torque demands 625/627 are defined, a pair of traction controllers like that described in FIG. 6 is used as illustrated in FIG. 8.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A method of providing traction control in an electric vehicle, wherein the electric vehicle is comprised of a motor coupled to an axle via a locking differential, the method comprising:

monitoring a torque value corresponding to said motor;

monitoring a plurality of wheel speed sensors corresponding to a plurality of vehicle wheels;

determining a maximum wheel speed corresponding to said plurality of vehicle wheels;

determining a minimum wheel speed corresponding to said plurality of vehicle wheels;

selecting a synchronized wheel speed from said maximum and minimum wheel speeds, wherein said maximum wheel speed is selected as said synchronized wheel speed if said torque value for said motor is positive, and wherein said minimum wheel speed is selected as said synchronized wheel speed if said torque value for said motor is negative;

multiplying said synchronized wheel speed by a transmission ratio to yield a first synchronized motor speed, wherein said transmission ratio corresponds to said locking differential, and wherein said first synchronized motor speed is at a first sample frequency;

translating said first synchronized motor speed to a second synchronized motor speed, wherein said second synchronized motor speed is at a second sample frequency, and wherein said second sample frequency is higher than said first sample frequency;

defining a maximum motor speed and a minimum motor speed from said second synchronized motor speed and a slip speed map;

inputting said maximum motor speed, said minimum motor speed, and a motor speed corresponding to said motor into a traction controller;

determining a first motor speed error from said maximum motor speed and said motor speed;

determining a second motor speed error from said minimum motor speed and said motor speed;

saturating said first motor speed error to obtain a first motor speed error correction value;

saturating said second motor speed error to obtain a second motor speed error correction value;

selecting a particular motor speed error correction value from said first and second motor speed error correction values;

feeding said particular motor speed error correction value to said traction controller;

creating a torque correction command that brings said particular motor speed error correction value to zero, wherein said step of creating said torque correction command is performed by said traction controller;

determining a current motor torque demand; and modifying said current motor torque demand by said torque correction command to yield a modified motor torque demand.

2. The method of claim 1, said step of monitoring a plurality of wheel speed sensors further comprising monitoring a first wheel speed sensor corresponding to a first wheel coupled to said axle and monitoring a second wheel speed sensor corresponding to a second wheel coupled to said axle.

3. The method of claim 2, said step of monitoring a plurality of wheel speed sensors further comprising monitoring a third wheel speed sensor corresponding to a third wheel coupled to a second axle and monitoring a fourth wheel speed sensor corresponding to a fourth wheel coupled to said second axle.

4. The method of claim 1, said step of monitoring a plurality of wheel speed sensors further comprising determining a plurality of wheel speeds corresponding to said plurality of vehicle wheels.

5. The method of claim 4, further comprising comparing said plurality of wheel speeds to determine said maximum wheel speed and said minimum wheel speed.

6. The method of claim 1, further comprising defining said transmission ratio when said locking differential is locked.

7. The method of claim 1, wherein said first sample frequency is approximately 100 Hz.

8. The method of claim 1, wherein said second sample frequency is approximately 1000 Hz.

9. The method of claim 1, wherein said plurality of wheel speed sensors correspond to a plurality of anti-lock braking system (ABS) wheel speed sensors.

10. The method of claim 1, said translating step further comprising interpolating said first synchronized motor speed to generate said second synchronized motor speed.

11. The method of claim 1, further comprising defining said slip speed map, wherein said slip speed map defines a maximum acceptable wheel slip.

12. The method of claim 1, said step of selecting said particular motor speed error correction value further comprising determining if said current motor torque demand corresponds to a positive value or to a negative value, wherein if said current motor torque demand corresponds to said positive value then said particular motor speed error correction value corresponds to said first motor speed error correction value, and wherein if said current motor torque demand corresponds to said negative value then said particular motor speed error correction value corresponds to said second motor speed error correction value.

* * * * *